(12) United States Patent
Shao et al.

(10) Patent No.: US 12,416,548 B2
(45) Date of Patent: Sep. 16, 2025

(54) METHODS, INTERNET OF THINGS (IOT) SYSTEMS, AND STORAGE MEDIA FOR SAFETY MONITORING OF SMART GAS AUXILIARY COMPONENTS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Yuefei Wu, Chengdu (CN); Lei Zhang, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/050,089

(22) Filed: Feb. 10, 2025

(65) Prior Publication Data
US 2025/0180440 A1   Jun. 5, 2025

(30) Foreign Application Priority Data
Dec. 31, 2024   (CN) .......................... 202411975350.X

(51) Int. Cl.
*G06F 13/00* (2006.01)
*F16K 37/00* (2006.01)
(Continued)

(52) U.S. Cl.
CPC ....... *G01M 99/008* (2013.01); *F16K 37/0083* (2013.01); *G06N 20/00* (2019.01)

(58) Field of Classification Search
CPC .................................................. G01M 99/008
See application file for complete search history.

(56) References Cited

U.S. PATENT DOCUMENTS

| 2023/0079768 A1* | 3/2023 | Shao ...................... G06Q 50/06 137/551 |
| 2023/0359705 A1* | 11/2023 | Vazquez-Canteli ..... G06F 17/16 |
| 2024/0330872 A1 | 10/2024 | Shao et al. |

FOREIGN PATENT DOCUMENTS

| CN | 101488213 A | 7/2009 |
| CN | 115050169 A | 9/2022 |

(Continued)

OTHER PUBLICATIONS

First Office Action in Chinese Application No. 202411975350.X mailed on Feb. 10, 2025, 15 pages.

(Continued)

*Primary Examiner* — Phuong Huynh
(74) *Attorney, Agent, or Firm* — Metis IP LLC

(57) ABSTRACT

Provided are a method, an Internet of Things (IoT) system, and a storage medium for safety monitoring of a smart gas auxiliary component. The method includes: determining a first anomaly value of an auxiliary component based on operation data of the auxiliary component; determining a target acquisition parameter based on the first anomaly value; determining an acquisition instruction based on the target acquisition parameter, and sending the acquisition instruction to at least one of an interactive device of a staff member or a drone to control an infrared detection device to acquire infrared data of the auxiliary component according to the target acquisition parameter; determining a second anomaly value of the auxiliary component based on the infrared data, environmental data, and the first anomaly value; and determining and sending at least one of a maintenance instruction or a parameter adjustment instruction to a monitoring component and the interactive device.

8 Claims, 5 Drawing Sheets

(51) Int. Cl.
   *G01M 99/00*     (2011.01)
   *G06N 20/00*     (2019.01)

(56) References Cited

FOREIGN PATENT DOCUMENTS

| | | | |
|---|---|---|---|
| CN | 116524617 | * | 8/2023 |
| CN | 116524617 A | | 8/2023 |
| CN | 117893357 A | | 4/2024 |
| CN | 118195838 A | | 6/2024 |
| CN | 118941173 A | | 11/2024 |
| JP | 2022003207 A | | 1/2022 |
| KR | 20080096240 A | | 10/2008 |
| KR | 20210049584 A | | 5/2021 |

OTHER PUBLICATIONS

Shao, Zehua, In-position Detection Technology of Electromechanical Valve for IoT Intelligent Gas Meter, Gas & Heat, 41(1): B23-B24&B35&B46, 2021.

Li, Yunzhi et al., Design of Intelligent Household Gas Leakage Monitoring&Detetion Alarm System, Information & Communications, 8: 49-51, 2019.

Gopalram, S et al., Smart Valve Control System for LPG Cylinders Using IoT, 2023 International Conference on Processing, Computation, Electronics, Power and Telecommunication (IConSCEPT), 2023, 6 pages.

\* cited by examiner

METHODS, INTERNET OF THINGS (IOT) SYSTEMS, AND STORAGE MEDIA FOR SAFETY MONITORING OF SMART GAS AUXILIARY COMPONENTS

CROSS-REFERENCE TO RELATED APPLICATIONS

This application claims priority to Chinese Application No. 202411975350.X, filed on Dec. 31, 2024, the entire contents of which are hereby incorporated by reference.

TECHNICAL FIELD

The present disclosure relates to the field of monitoring auxiliary components of gas pipelines, and in particular relates to a method, an Internet of Things (IoT) system, and a storage medium for safety monitoring of a smart gas auxiliary component.

BACKGROUND

Promoting the development of a smart gas system is one of the most important ways to improve the efficiency of city management and the quality of life of residents. In the smart gas system, an operation status of an auxiliary component (e.g., a flange, a valve, a compensator, a drainer, a discharge pipe, etc.) has a significant impact on the safety and stability of the entire gas network. Anomalies in the auxiliary component may directly affect the efficiency of gas delivery and safety of use.

CN110261437B provides a method using infrared detection equipment to obtain infrared thermal images of natural gas station pressure equipment, thereby processing and recognizing extracted detection data through the images. The method achieves automated, fast, and low-cost defect inspection of natural gas station pressure equipment. However, the method relies solely on infrared image processing and recognition without integrating multiple data types for comprehensive analysis, which leads to limitations in detection results and the risk of misjudgment.

Therefore, it is desirable to provide a method, an Internet of Things (IoT) system, and a storage medium for safety monitoring of a smart gas auxiliary component, which combine multiple data types to achieve real-time monitoring and intelligent management of the auxiliary component, making detection results more comprehensive and accurate.

SUMMARY

To address the issue of improving the screening efficiency and accuracy of auxiliary components of gas pipelines, the present disclosure provides a method, an Internet of Things (IoT) system, and a storage medium for safety monitoring of a smart gas auxiliary component.

The present disclosure includes a method for safety monitoring of a smart gas auxiliary component. The method comprises: determining a first anomaly value of the auxiliary component based on operation data of the auxiliary component, wherein the auxiliary component includes at least one of a flange, a valve, a compensator, a drainer, or a discharge pipe, the auxiliary component is disposed in a gas pipeline, and the operation data includes at least one of audio data, temperature data, or vibration data; determining a target acquisition parameter based on the first anomaly value; determining an acquisition instruction based on the target acquisition parameter, and sending the acquisition instruction to at least one of an interactive device of a staff member or a drone to control an infrared detection device to acquire infrared data of the auxiliary component according to the target acquisition parameter, the infrared data including an infrared thermogram; determining a second anomaly value of the auxiliary component based on the infrared data, environmental data, and the first anomaly value; and determining at least one of a maintenance instruction or a parameter adjustment instruction based on the second anomaly value, and sending the at least one of the maintenance instruction or the parameter adjustment instruction to a monitoring component and the interactive device, wherein the maintenance instruction is configured to instruct the staff member to manually maintain the auxiliary component, the parameter adjustment instruction is configured to adjust a monitoring parameter of the monitoring component before completing the maintenance, and the monitoring component is configured to monitor the operation data of the auxiliary component.

The present disclosure includes an Internet of Things (IoT) system for safety monitoring of a smart gas auxiliary component, comprising a government safety monitoring management platform, a government safety monitoring sensor network platform, a government safety monitoring object platform, a gas company management platform, a gas company sensor network platform, a gas equipment object platform, and a gas pipeline maintenance object platform. The IoT system is configured to: enable the government safety monitoring management platform to obtain, through the government safety monitoring sensor network platform, operation data of an auxiliary component captured by the gas company management platform, the auxiliary component including at least one of a flange, a valve, a compensator, a drainer, or a discharge pipe, the auxiliary component being disposed in a gas pipeline, the operation data including at least one of audio data, temperature data, or vibration data; determine, via the government safety monitoring management platform, a first anomaly value of the auxiliary component based on the operation data; determine a target acquisition parameter based on the first anomaly value; and determine an acquisition instruction based on the target acquisition parameter; send the acquisition instruction to the government safety monitoring object platform and further to at least one of the gas pipeline maintenance object platform or the gas equipment object platform to control an infrared detection device to acquire infrared data of the auxiliary component according to the target acquisition parameter, the infrared data including an infrared thermogram; acquire environmental data via the government safety monitoring sensor network platform; and determine, via the government safety monitoring management platform, a second anomaly value of the auxiliary component based on the infrared data, the environmental data, and the first anomaly value; determine at least one of a maintenance instruction or a parameter adjustment instruction based on the second anomaly value, and send the at least one of the maintenance instruction or the parameter adjustment instruction to the gas company management platform, and further send the at least one of the maintenance instruction or the parameter adjustment instruction by the gas company management platform to the gas equipment object platform and the gas pipeline maintenance object platform, wherein the maintenance instruction is configured to instruct a staff member to manually maintain the auxiliary component, the parameter adjustment instruction is configured to adjust a monitoring parameter of the monitoring component before completing the maintenance, and the monitoring component is configured to monitor the operation data of the auxiliary component.

The present disclosure includes a non-transitory computer-readable medium, comprising executable instructions that, when executed by at least one processor, direct the at least one processor to perform a method. The method comprises: determining a first anomaly value of an auxiliary component based on operation data of the auxiliary component, wherein the auxiliary component includes at least one of a flange, a valve, a compensator, a drainer, or a discharge pipe, the auxiliary component is disposed in a gas pipeline, and the operation data includes at least one of audio data, temperature data, or vibration data; determining a target acquisition parameter based on the first anomaly value; determining an acquisition instruction based on the target acquisition parameter, and sending the acquisition instruction to at least one of an interactive device of a staff member or a drone to control an infrared detection device to acquire infrared data of the auxiliary component according to the target acquisition parameter, the infrared data including an infrared thermogram; determining a second anomaly value of the auxiliary component based on the infrared data, environmental data, and the first anomaly value; and determining at least one of a maintenance instruction or a parameter adjustment instruction based on the second anomaly value, and sending the at least one of the maintenance instruction or the parameter adjustment instruction to a monitoring component and the interactive device, wherein the maintenance instruction is configured to instruct the staff member to manually maintain the auxiliary component, the parameter adjustment instruction is configured to adjust a monitoring parameter of the monitoring component before completing the maintenance, and the monitoring component is configured to monitor the operation data of the auxiliary component.

Beneficial effects brought about by the present disclosure include, but are not limited to the following. (1) By analyzing the operational data of auxiliary components, the screening scope can be initially narrowed down. Subsequently, infrared data is obtained from the narrowed-down auxiliary components for further analysis to identify operational anomalies and select the abnormal component. Inspection is then carried out via the drone or staff member, addressing the issue of maintenance screening for auxiliary components and improving both screening efficiency and accuracy. (2) By extracting temperature, audio, and vibration data related to the operation of auxiliary components from operational data, and assessing these three aspects together to determine if there are abnormalities in the operation status of the components, the method reduces errors caused by relying on a single type of data, ensuring that the first anomaly value obtained more accurately reflects the actual operational condition of the auxiliary components. (3) By determining the temperature center and the central characteristic of the temperature center, temperature data that indicate anomalies due to the self-operation of auxiliary components can be identified, eliminating interference data from the infrared data.

DETAILED DESCRIPTION

Figure 1:
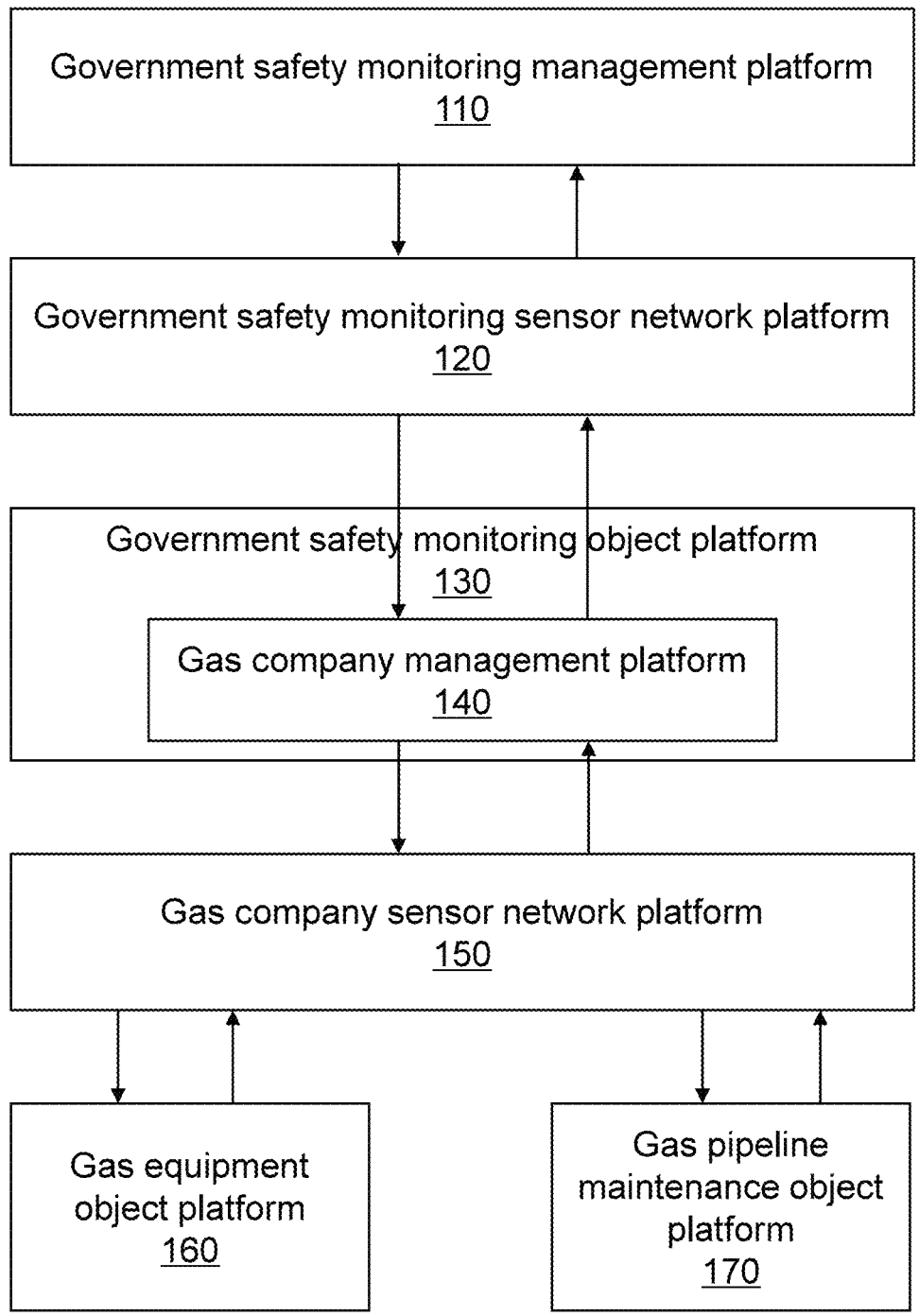
FIG. 1 is a block diagram of an exemplary Internet of Things (IoT) system for safety monitoring of a smart gas auxiliary component according to some embodiments of the present disclosure.

To more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

FIG. 1 is a block diagram illustrating an exemplary Internet of Things (IoT) system for safety monitoring of a smart gas auxiliary component according to some embodiments of the present disclosure.

As shown in FIG. 1, an IoT system 100 for safety monitoring of a smart gas auxiliary component may include a government safety monitoring management platform 110, a government safety monitoring sensor network platform 120, a government safety monitoring object platform 130, a gas company management platform 140, a gas company sensor network platform 150, a gas equipment object platform 160, and a gas pipeline maintenance object platform 170.

The government safety monitoring management platform 110 refers to a comprehensive management platform for government management information.

In some embodiments, the government safety monitoring management platform 110 is configured to process and store safety monitoring data of the smart gas auxiliary component. For example, the government safety monitoring management platform 110 determines a first anomaly value based on operation data of the auxiliary component. As another example, the government safety monitoring management platform 110 determines a target acquisition parameter based on the first anomaly value. As yet another example, the government safety monitoring management platform 110 determines a second anomaly value of the auxiliary component based on infrared data, environmental data, and the first anomaly value.

In some embodiments, the government safety monitoring management platform 110 interacts with the government safety monitoring sensor network platform 120.

The government safety monitoring sensor network platform 120 refers to a functional platform for managing sensor communications. In some embodiments, the government safety monitoring sensor network platform 120 performs the functions of sensing communications for sensing information and controlling information. In some embodiments, the government safety monitoring sensor network platform 120 interacts with the government safety monitoring management platform 110 and the gas company management platform 140. For example, the government safety monitoring management platform 110 obtains the operation data from the gas company management platform 140 based on the government safety monitoring sensor network platform 120.

In some embodiments, the government safety monitoring sensor network platform 120 is configured to obtain the environmental data.

The government safety monitoring object platform 130 refers to a functional platform for monitoring and managing the execution of instructions.

The gas company management platform 140 is a platform for managing gas companies and parameters related to gas pipelines. In some embodiments, the gas company management platform 140 interacts with the gas company sensor network platform 150 and the government safety monitoring sensor network platform 120.

The gas company sensor network platform 150 refers to a functional platform for managing sensing communications. In some embodiments, the gas company sensor network platform 150 realizes the functions of sensing communication for sensing information and control information. In some embodiments, the gas company sensor network platform 150 interacts with the gas company management platform 140, the gas equipment object platform 160, and the gas pipeline maintenance object platform 170.

The gas equipment object platform 160 refers to a functional platform for sensing the generation of gas equipment information and controlling the execution of the gas equipment information.

In some embodiments, the gas equipment object platform 160 is configured as a monitoring component, a drone, and an infrared detection device.

In some embodiments, the gas equipment object platform 160 uploads the operation data of the auxiliary component, via the government safety monitoring sensor network platform 120, to the government safety monitoring management platform 110.

The gas pipeline maintenance object platform 170 refers to a functional platform for sensing the generation of gas user information and controlling the execution of the gas user information.

In some embodiments, the gas pipeline maintenance object platform 170 is configured as an interactive device of a staff member.

In some embodiments, the platforms of the IoT system 100 are divided into a smart gas primary network and a smart gas secondary network. The smart gas primary network refers to a network for a government user to regulate the operation of a gas pipeline network, and the smart gas secondary network refers to a network for the operation of the gas pipeline network. In some embodiments, a same platform of the IoT system 100 assumes different roles in the smart gas primary network and the smart gas secondary network.

In some embodiments, the smart gas primary network includes a smart gas primary network management platform, a smart gas primary network sensor network platform, and a smart gas primary network object platform. The smart gas primary network management platform includes the government safety monitoring management platform 110, the smart gas primary network sensor network platform includes the government safety monitoring sensor network platform 120, and the smart gas primary network object platform includes the government safety monitoring object platform 130.

In some embodiments, the smart gas secondary network includes a smart gas secondary network management platform, a smart gas secondary network sensor network platform, and a smart gas secondary network object platform. The smart gas secondary network management platform includes the gas company management platform 140, the smart gas secondary network sensor network platform includes the gas company sensor network platform 150, and the smart gas secondary network object platform includes at least one of the gas equipment object platform 160 and the gas pipeline maintenance object platform 170.

More descriptions of the auxiliary component, the operation data, the first anomaly value, the target acquisition parameter, the acquisition instruction, and the second anomaly value may be found in FIGS. 2-5 and their related descriptions.

In some embodiments of the present disclosure, a closed loop of information operation can be formed among the various platforms of the IoT system 100, such that the platforms can operate in a coordinated and regulated manner under the unified management of the government safety monitoring management platform 110, thereby realizing smart and information-based IoT system 100 for safety monitoring of the smart gas auxiliary component.

Figure 2:
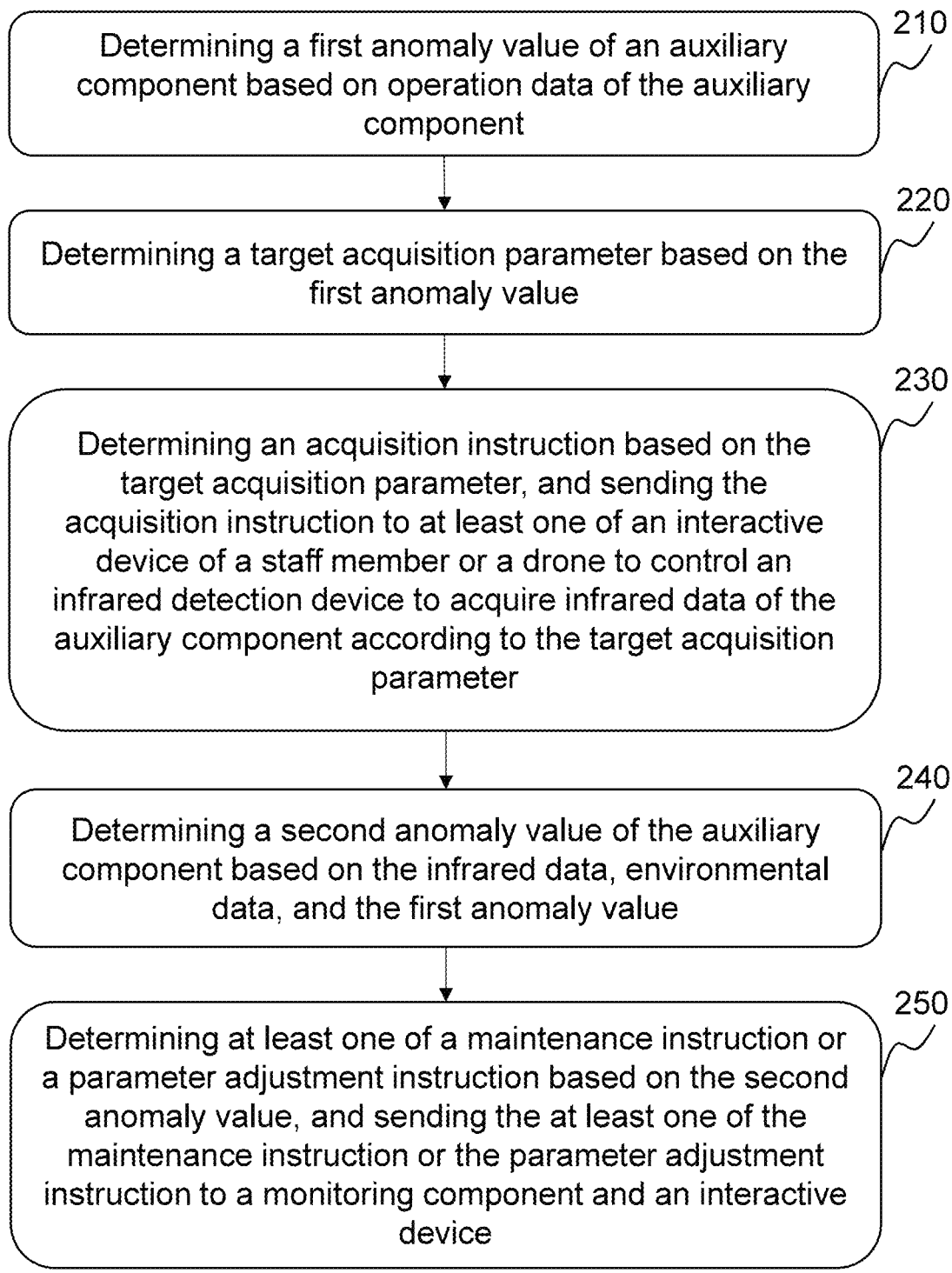
FIG. 2 is a flowchart of an exemplary process of a method for safety monitoring of a smart gas auxiliary component according to some embodiments of the present disclosure.

FIG. 2 is a flowchart of an exemplary process of a method for safety monitoring of a smart gas auxiliary component according to some embodiments of the present disclosure. As shown in FIG. 2, process 200 includes the following operations. In some embodiments, process 200 is performed by the IoT system 100.

In 210, determining a first anomaly value of an auxiliary component based on operation data of the auxiliary component.

The auxiliary component refers to a component that ensures the safe operation of the IoT system 100 and facilitates maintenance and repair. For example, the auxiliary component includes, but is not limited to, a valve, a compensator, a drainer, a discharge pipe, or the like.

In some embodiments, to ensure the safe operation of a pipeline network and considering the needs for maintenance and wiring, the auxiliary component is located on a gas pipeline.

The operation data refers to data captured by the auxiliary component during operation. For example, the operation data includes, but is not limited to, audio data, temperature data, vibration data, or the like.

The audio data refers to a sound signal generated by the auxiliary component during operation. In some embodiments, the audio data is represented as a signal wave.

The temperature data refers to the temperature at which the auxiliary component is operating. In some embodiments, the temperature data includes the temperature at which the auxiliary component is operating at at least one time point. For example, the temperature data is represented by $[(T_1, t_1), (T_2, t_2), \ldots (T_n, t_n)]$, wherein $t_n$ denotes an $n^{th}$ time point, $T_n$ denotes the operating temperature of the auxiliary component at the $n^{th}$ time point, and n denotes a positive integer.

The vibration data refers to a vibration signal generated by the auxiliary component during operation. In some embodiments, the vibration data is represented as a signal wave.

In some embodiments, the operation data of the auxiliary component is obtained in a variety of ways. For example, the government safety monitoring management platform 110 obtains the operation data through a monitoring component. The monitoring component refers to a device or a sensor in the IoT system 100, used to monitor an operation status of the auxiliary component in real time. The monitoring component includes an audio data acquisition device, a temperature data acquisition device, a vibration data acquisition device, or the like.

The first anomaly value refers to a numerical value, an alphabetical value, or the like used to reflect the degree of abnormality in the operation of the auxiliary component. For example, the first anomaly value is represented by a value less than 1.

In some embodiments, the higher the first anomaly value, the higher the likelihood of an incident in the pipeline in which the auxiliary component is located.

In some embodiments, the government safety monitoring management platform 110 determines the first anomaly value in a variety of ways based on the operation data of the auxiliary component. For example, the government safety monitoring management platform 110 determines the first anomaly value through the following operations:

S211, the government safety monitoring management platform 110 determines reference operation data based on the auxiliary component.

The reference operation data refers to the operation data captured by the auxiliary component under normal operation. For example, the reference operation data includes, but is not limited to, reference audio data, reference temperature data, reference vibration data, or the like.

In some embodiments, the reference operation data is determined from historical data.

S212, the government safety monitoring management platform 110 determines a similarity between the operation data of the auxiliary component and the corresponding reference operation data.

In some embodiments, the government safety monitoring management platform 110 quantifies the reference operation data and the operation data of the auxiliary component into vectors. For example, since the temperature data is sequential data, the government safety monitoring management platform 110 directly quantifies the temperature data into a vector. As another example, since the audio data is a continuous signal wave, the government safety monitoring management platform 110 randomly samples the signal wave by selecting a series of sample points, thereby constructing a vector containing a plurality of sample times and their corresponding sound signals. The vibration data is quantized in a manner similar to the audio data, and is not described herein.

In some embodiments, the similarity between the reference operation data and the operation data is negatively correlated to a vector distance between the reference operation data and the operation data, the vector distance being determined based on a cosine distance, or the like. In some embodiments, the government safety monitoring management platform 110 determines the vector distance between the reference operation data and the operation data, and then determines the similarity between the reference operation data and the operation data by searching a look-up table.

The similarity refers to a degree of similarity between the reference operation data and the actual operation data of the auxiliary component. For example, the similarity is a value between 0 and 1, wherein the closer the value is to 1, the higher the similarity is.

S213, the government safety monitoring management platform 110 determines the first anomaly value of the auxiliary component as 1 minus a maximum value of the similarity.

Understandably, there may be a plurality of pieces of reference operation data and correspondingly, a plurality of values of the similarity. The greater the value of the similarity, the greater the likelihood of normal operation, resulting in a smaller first anomaly value. Therefore, the government safety monitoring management platform 110 may determine the first anomaly value based on the maximum value of the similarity.

In some embodiments, the government safety monitoring management platform 110 may also determine a reference interval based on the operation data; determine an operational characteristic based on the reference interval; determine an operational intensity based on the operational characteristic; and then determine the first anomaly value based on the operational intensity. More descriptions of the reference interval, the operational characteristic, the operational intensity, and the determination of the first anomaly value may be found in FIG. 3 and its related descriptions.

In 220, determining a target acquisition parameter based on the first anomaly value.

The target acquisition parameter refers to a sequence for on-site infrared data collection.

In some embodiments, the government safety monitoring management platform 110 determines the target acquisition parameter in a plurality of ways. For example, the government safety monitoring management platform 110 obtains the target acquisition parameter by filtering out auxiliary components with first anomaly values greater than a first preset threshold and arranging the auxiliary components in order of the first anomaly values of the auxiliary components. The arrangement sequence is determined as an acquisition sequence, thereby obtaining the target acquisition parameter.

The first preset threshold refers to a threshold for determining whether the first anomaly value exceeds a normal safety standard. In some embodiments of the present disclosure, the first preset threshold is set by a person skilled in the art or by system default. For example, the first preset threshold is 10%.

In 230, determining an acquisition instruction based on the target acquisition parameter, and send the acquisition instruction to at least one of an interactive device of a staff member or a drone to control an infrared detection device to acquire the infrared data of the auxiliary component according to the target acquisition parameter.

The acquisition instruction refers to an instruction for acquiring the infrared data that is recognizable for the IoT system 100.

In some embodiments, the government safety monitoring management platform 110 encodes the target acquisition parameter to obtain the acquisition instruction. The encoding includes encoding the target acquisition parameter into a binary code, an ASCII code, or the like.

In some embodiments, the government safety monitoring management platform 110 sends the acquisition instruction to the government safety monitoring object platform 130 and further to the interactive device of the staff member. In response to receiving a notification from the interactive device, the staff member operates the infrared detection device to detect the infrared data of the auxiliary component and manually uploads the infrared data to the IoT system 100.

In some embodiments, the government safety monitoring management platform 110 may send the acquisition instruction to the gas equipment object platform 160 and further to the drone to control the infrared detection device to acquire the infrared data of the auxiliary component based on the target acquisition parameter. For example, the infrared detection device may be mounted on the drone, and the infrared data may be detected by controlling the drone or through autonomous drone movement. The infrared data may be sent to the IoT system 100 via copying or a wireless network.

The interactive device refers to a device that enables the IoT system 100 to communicate information with a user. For example, the interactive device includes, but are not limited to, an application on the staff member's work device (e.g., a cell phone, a computer, etc.).

The infrared detection device refers to a device for detecting infrared radiation (i.e., thermal radiation). For example, the infrared detection device includes, but is not limited to, an infrared thermal camera, an infrared camera, or the like.

The infrared data refers to infrared radiation information collected by the infrared detection device for use in analyzing and monitoring thermal distribution, temperature changes, and potential thermal anomalies of the auxiliary component. For example, the infrared data includes, but is not limited to, an infrared thermogram.

In 240, determining a second anomaly value of the auxiliary component based on the infrared data, environmental data, and the first anomaly value.

The environmental data refers to data related to an environment in which the auxiliary component is located. For example, the environmental data includes, but is not limited to, an environmental temperature, a humidity level, an environmental dust concentration, a ventilation level, or the like.

In some embodiments, the government safety monitoring management platform 110 obtains the environmental data based on the government safety monitoring sensor network platform 120.

The second anomaly value refers to an adjusted numerical, an adjusted alphabetical value, etc., of the first anomaly value of the auxiliary component, used to reflect a degree of operational abnormality of the auxiliary component. For example, the second anomaly value is represented by a number less than 1.

In some embodiments, the government safety monitoring management platform 110 determines the second anomaly value based on the infrared data, the environmental data, and the first anomaly value in multiple ways.

In some embodiments, the government safety monitoring management platform 110 performs clustering based on infrared data, environmental data, first anomaly values in historical data, and subsequent actual second anomaly values to obtain a plurality of first clustering centers. Types of clustering algorithms may include K-Means clustering, Density-Based Spatial Clustering of Applications with Noise (DBSCAN), or the like. The types of clustering algorithms are not restricted by the present disclosure.

In some embodiments, the government safety monitoring management platform 110 constructs a first standard vector based on the infrared data, the environmental data, and the first anomaly value corresponding to the first clustering center. A standard second anomaly value corresponding to the first standard vector is the actual frequency of incidents that occurred to the corresponding auxiliary component during a historical period.

When determining the second anomaly value of the auxiliary component, a first vector to be matched is constructed based on current infrared data, current environmental data, and a current first anomaly value of the auxiliary component.

In some embodiments, the second anomaly value corresponding to the first vector to be matched is determined by determining a similarity between the first vector to be matched and the first standard vector. For example, the standard second anomaly value corresponding to a vector with a highest similarity to the first standard vector, i.e., a vector with a shortest distance, is used as the second anomaly value corresponding to the first vector to be matched. The similarity between the first vector to be matched and the first standard vector is negatively correlated to a vector distance between the first vector to be matched and the first standard vector. The vector distance may be determined based on a cosine distance, or the like. For example, the similarity is a reciprocal of the vector distance.

In some embodiments, the government safety monitoring management platform 110 may determine, based on the infrared data, a temperature center of the infrared data and a central characteristic of the temperature center; determine, based on the temperature center and the central characteristic of the temperature center, a temperature characteristic of the auxiliary component; and determine the second anomaly value based on the temperature characteristic, the environmental data, and the first anomaly value. More about the temperature center and the central characteristic of the temperature center, the temperature characteristic, and how to determine the second anomaly value may be found in FIG. 4 and its associated descriptions.

In 250, determining at least one of a maintenance instruction or a parameter adjustment instruction based on the second anomaly value, and sending the at least one of the maintenance instruction or the parameter adjustment instruction to the monitoring component and the interactive device.

The maintenance instruction refers to an instruction for maintaining the auxiliary component. In some embodiments, the maintenance instruction instructs the staff member to manually maintain the auxiliary component.

In some embodiments, the government safety monitoring management platform 110 identifies an auxiliary component with a second anomaly value greater than a second preset threshold as a component requiring maintenance, and synthesizes information of the auxiliary component requiring maintenance to generate the maintenance instruction recognizable by the IoT system 100. For example, the maintenance instruction may be in text-based, binary encoded, or other machine-readable formats. In some embodiments, the maintenance instruction includes specific information of the auxiliary component that needs to be maintained, such as a number, a location, etc., of the auxiliary component.

The second preset threshold refers to a threshold for determining whether the auxiliary component requires maintenance. In some embodiments, the second preset threshold is set by a person skilled in the art or by system default. For example, the second preset threshold is 5%.

The parameter adjustment instruction refers to an instruction used to adjust a monitoring parameter of the monitoring component to optimize a monitoring effect before completing the maintenance. More on the monitoring component may be found in the above related descriptions.

The monitoring parameter refers to a parameter used to adjust the monitoring effect of the monitoring component. For example, the monitoring parameter includes, but is not limited to, a monitoring frequency, or the like.

In some embodiments, the government safety monitoring management platform 110 determines the parameter adjustment instruction based on the second anomaly value by querying a first preset relationship table.

In some embodiments, the first preset relationship table includes a correspondence between second anomaly values of auxiliary components and parameter adjustment instructions. In some embodiments, for a second anomaly value, the government safety monitoring management platform 110 monitors the auxiliary component with the second anomaly value at different monitoring frequencies, and identifies the monitoring frequency at which the second anomaly value is reduced the most, thus constructing the first preset relationship table.

In some embodiments, the government safety monitoring management platform 110 sends the maintenance instruction and the parameter adjustment instruction to the gas company management platform 140 of the government safety monitoring object platform 130. The gas company management platform 140 further transmits the maintenance instruction and the parameter adjustment instruction to the monitoring component of the gas equipment object platform 160 and the interactive device of the gas pipeline maintenance object platform 170.

In some embodiments of the present disclosure, by analyzing the operational data of auxiliary components, the screening scope can be initially narrowed. Subsequently, by acquiring the infrared data of the narrowed-down auxiliary components, their operational anomalies can be further analyzed, and the abnormal auxiliary components can be identified. Then, inspection is carried out by the drone or the staff member, addressing the maintenance screening issue for auxiliary components and improving screening efficiency and accuracy. At the same time, the method reduces the consumption of human and material resources while ensuring the safety of gas usage.

It should be noted that the foregoing description of process 200 is intended to be exemplary and illustrative only and does not limit the scope of the present disclosure. For a person skilled in the art, various modifications and changes may be made to process 200 under the guidance of the present disclosure. However, these modifications and changes remain within the scope of the present disclosure.

Figure 3:
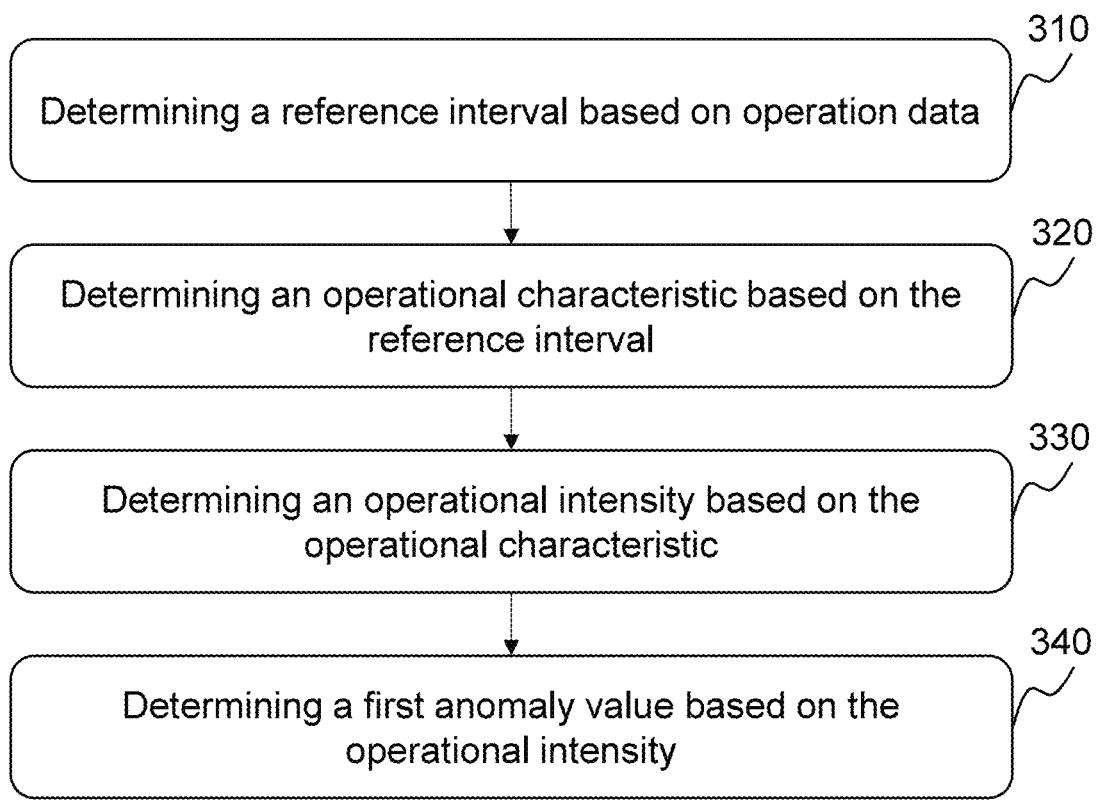
FIG. 3 is a flowchart of an exemplary process for determining a first anomaly value according to some embodiments of the present disclosure.

FIG. 3 is a flowchart of an exemplary process for determining a first anomaly value according to some embodiments of the present disclosure. As shown in FIG. 3, process 300 includes the following operations. In some embodiments, process 300 is performed by the government safety monitoring management platform 110.

In 310, determining a reference interval based on operation data.

The reference interval refers to a range in which reference operation data is located. For example, the reference interval includes, but is not limited to, a reference audio interval, a reference temperature interval, and a reference vibration interval.

The reference audio interval refers to a range in which audio data is located; the reference temperature interval refers to a range in which temperature data is located; and the reference vibration interval refers to a range in which vibration data is located.

In some embodiments, the government safety monitoring management platform 110 may obtain a plurality of segments of reference audio data, as different environments and working conditions generate corresponding reference audio data. In some embodiments, the plurality of segments of reference audio data are stored in a database.

In some embodiments, the government safety monitoring management platform 110 determines the reference audio interval by determining a sequence similarity between current audio data of an auxiliary component and the plurality of segments of reference audio data, identifying reference audio data with a greatest sequence similarity as the reference audio interval. The determination of the reference audio interval may include the following operations:

S311, for each of the plurality of segments of the reference audio data, a sliding selection is performed using a sliding window with a preset step size, thereby obtaining a plurality of candidate reference audio intervals. For each of the candidate reference audio intervals, a sequence similarity between the audio data and the candidate reference audio interval is determined. A length of the sliding window, a length of the candidate reference audio interval, and a length of the audio data are the same. In some embodiments, techniques for determining the sequence similarity includes, but is not limited to, a Manhattan distance technique, a Support vector machine (SVM) technique, or the like.

S312, the above operation is performed on the plurality of reference audio data to obtain a plurality of sequence similarities. A largest sequence similarity is selected from the plurality of sequence similarities, and a corresponding candidate reference audio interval is determined as the reference audio interval. For example, assuming that there are 20 segments of reference audio data, and each segment is divided into 30 sliding windows based on the preset step size and a size of the sliding window, a total of 600 (20×30) comparisons are performed to obtain 600 sequence similarities, and then the candidate reference audio interval corresponding to the largest sequence similarity from the 600 sequence similarities is determined the as the reference audio interval.

The sequence similarity refers to a similarity between the audio data and the reference audio data.

In some embodiments, the similarity between the audio data and the reference audio data is negatively correlated to a vector distance between the audio data and the reference audio data, the vector distance being determined based on a cosine distance, or the like. For example, the similarity is a reciprocal of the vector distance.

The way of determining the reference temperature interval and the reference vibration interval is similar to the way of determining the reference audio interval, and is not repeated here.

In 320, determining an operational characteristic based on the reference interval.

The operational characteristic refers to a characteristic used to characterize an abnormal operation status of the auxiliary component. For example, the operational characteristic includes an audio anomaly vector, a temperature anomaly vector, a vibration anomaly vector, or the like.

The audio anomaly vector refers to a vector consisting of anomalous audio difference values and time points corresponding to the anomalous audio difference values. For example, the audio anomaly vector is represented by $[(t_1, a_1), (t_2, a_2), \ldots, (t_n, a_n)]$, where $t_1, t_2, \ldots, t_n$ denote the time points of audio anomalies, $a_1, a_2, \ldots, a_n$ denote the audio difference values at the corresponding time points.

An audio difference value refers to a difference between the audio data of an auxiliary component during abnormal operation and the reference audio data.

In some embodiments, the government safety monitoring management platform 110 constructs the audio anomaly vector as follows. Since the length of the audio data is the same as the length of the reference audio interval, a count of time points in the audio data is equal to a count of time points in the reference audio interval. By sequentially comparing the audio data and the reference audio interval at each time point, and a time point where the corresponding audio difference value is greater than a third preset threshold is identified as an audio anomaly time point, and the audio difference value of the time point is identified as the audio difference value corresponding to the audio anomaly time point. Thereby, a plurality of audio anomaly time points and their corresponding audio difference values are combined into a vector to obtain the audio anomaly vector.

The third preset threshold refers to a threshold for determining whether the audio data is abnormal. In some embodiments, the third preset threshold is set by a person skilled in the art or by system default.

The temperature anomaly vector refers to a vector consisting of anomalous temperature difference values and their time points. The vibration anomaly vector refers to a vector consisting of anomalous vibration difference values and their time points.

The construction manner of the temperature anomaly vector and the vibration anomaly vector is similar to that of the construction manner of the audio anomaly vector, which is no longer described here.

In 330, determining an operational intensity based on the operational characteristic.

The operational intensity refers to a numerical value that reflects a degree of abnormal operation of the auxiliary component. For example, the operational intensity includes an audio anomaly intensity, a temperature anomaly intensity, a vibration anomaly intensity, etc.

The audio anomaly intensity refers to an intensity value associated with the audio data when the auxiliary component operates abnormally. The temperature anomaly intensity refers an intensity value associated with the temperature data when the auxiliary component operates abnormally. The vibration anomaly intensity refers to an intensity value associated with the vibration data when the auxiliary component operates abnormally.

In some embodiments, the audio anomaly intensity is positively correlated with a count of audio anomaly time points in the reference audio interval and an average value of audio anomaly values in the reference audio interval. The government safety monitoring management platform 110 determines the audio anomaly intensity based on the count of the audio anomaly time points in the reference audio interval and the average value of the audio anomaly values in the reference audio interval using Equation (1):

$$V = k_1 \times V_t + k_2 \times V_z, \tag{1}$$

wherein V denotes the audio anomaly intensity, $k_1$ denotes a weight coefficient for the count of the audio anomaly time points in the reference audio interval, $k_2$ denotes a weight coefficient for the average value of the audio anomaly values in the reference audio interval, $V_t$ denotes the count of the audio anomaly time points in the reference audio interval, and $V_z$ denotes the average value of the audio anomaly values in the reference audio interval. In some embodiments, $k_1$, $k_2$ are positive numbers and may be predefined.

In some embodiments, the temperature anomaly intensity is positively correlated with a count of temperature anomaly time points in the reference temperature interval and an average value of temperature anomaly values in the reference temperature interval. The government safety monitoring management platform 110 determines the temperature anomaly intensity based on the count of the temperature anomaly time points in the reference temperature interval and the average value of the temperature anomaly values in the reference temperature interval using Equation (2):

$$T = k_3 \times T_t + k_4 \times T_z, \tag{2}$$

wherein T denotes the temperature anomaly intensity, $k_3$ denotes the weight coefficient for the count of the temperature anomaly time points in the reference temperature interval, $k_4$ denotes the weight coefficient for the average value of the temperature anomaly values, Tt denotes the count of the temperature anomaly time points in the reference temperature interval, and $T_2$ denotes the average value of the temperature anomaly values in the reference temperature interval. In some embodiments, $k_3$, $k_4$ are positive numbers that may be predefined.

In some embodiments, the vibration anomaly intensity is positively correlated with a count of vibration anomaly time points in the reference vibration interval and an average value of vibration anomaly values in the reference vibration interval. The government safety monitoring management platform 110 determines the vibration anomaly intensity based on the count of the vibration anomaly time points in the reference vibration interval and the average value of the vibration anomaly values in the reference vibration interval using Equation (3):

$$M = k_5 \times M_t + k_6 \times M_z, \tag{3}$$

wherein M denotes the vibration anomaly intensity, $k_5$ denotes the weight coefficient for the count of the vibration anomaly time points in the reference vibration interval, $k_6$ denotes the weight coefficient for the average value of the vibration anomaly values, Mt denotes the count of the vibration anomaly time points in the reference vibration interval, and $M_z$ denotes the average value of the vibration anomaly in the reference vibration interval. In some embodiments, $k_5$, $k_6$ are positive numbers and may be predefined.

In 340, determining a first anomaly value based on the operational intensity.

In some embodiments, the government safety monitoring management platform 110 may determine the first anomaly value based on the operational intensity in various ways. For example, the first anomaly value is positively corrected with the audio anomaly intensity, the temperature anomaly intensity and the vibration anomaly intensity. The government safety monitoring management platform 110 determines the first anomaly value based on the audio anomaly intensity, the temperature anomaly intensity and the vibration anomaly intensity using Equation (4):

$$Y_1 = w_1 \times V + w_2 \times T + w_3 \times M, \quad (4)$$

wherein $Y_1$ denotes the first anomaly value, V denotes the audio anomaly intensity, T denotes the temperature anomaly intensity, M denotes the vibration anomaly intensity, and $w_1$, $w_2$, $w_3$ denote weight coefficients of the audio anomaly intensity, the temperature anomaly intensity, and the vibration anomaly intensity, respectively.

In some embodiments, $w_1$, $w_2$, $w_3$ are preset based on historical empirical data. For example, the government safety monitoring management platform 110, based on empirical knowledge derived from historical data, indicates if vibration anomalies provide a higher accuracy in malfunction detection, the corresponding weight coefficient $w_3$ is increased to enhance its importance in malfunction detection.

In some embodiments, the government safety monitoring management platform 110 determines an amplification coefficient based on the reference audio interval, the reference temperature interval, and the reference vibration interval.

The amplification coefficient refers to a numerical value used to measure a degree of similarity between the operational characteristic and the reference operation data within a time interval.

In some embodiments, the government safety monitoring management platform 110 may determine the amplification coefficient, which is negatively correlated with an average pairwise distance between the reference audio interval, reference temperature interval, and reference vibration interval, using Equation (5):

$$a = 1 + \left[\frac{K}{S+1}\right], \quad (5)$$

wherein a denotes the amplification coefficient, S denotes the average pairwise distance between the reference audio interval, the reference temperature interval, and the reference vibration interval, and K denotes a weight coefficient. In some embodiments, K is a positive number and may be predefined.

Understandably, since K and S are positive numbers, a is greater than 1, thus acting as an amplification factor.

In some embodiments, the pairwise distance between the reference audio interval, the reference temperature interval, and the reference vibration interval refers to a time difference in time intervals where any two of the reference audio interval, the reference temperature interval, and the reference vibration interval are located.

For example, as shown in Table 1, when the reference audio interval is $[a_{y1}, a_{y2}, a_{y3}]$, the reference temperature interval is $[b_{y7}, b_{y8}, b_{y9}]$, and the reference vibration interval is $[c_{y5}, c_{y6}, c_{y7}]$. Then the pairwise distance between the reference audio interval and the reference temperature interval is $t_{y7}-t_{y1}$, the pairwise distance between the reference audio interval and the reference vibration interval is $t_{y5}-t_{y1}$, and the pairwise distance between the reference temperature interval and the reference vibration interval is $t_{y7}-t_{y5}$.

TABLE 1

| Time | $t_{y1}$ | $t_{y2}$ | $t_{y3}$ | $t_{y4}$ | $t_{y5}$ | $t_{y6}$ | $t_{y7}$ | $t_{y8}$ | $t_{y9}$ | ... |
|---|---|---|---|---|---|---|---|---|---|---|
| Audio data | $a_{y1}$ | $a_{y2}$ | $a_{y3}$ | $a_{y4}$ | $a_{y5}$ | $a_{y6}$ | $a_{y7}$ | $a_{y8}$ | $a_{y9}$ | ... |
| Temperature data | $b_{y1}$ | $b_{y2}$ | $b_{y3}$ | $bt_{y4}$ | $b_{y5}$ | $b_{y6}$ | $b_{y7}$ | $b_{y8}$ | $b_{y9}$ | ... |
| Vibration data | $c_{y1}$ | $c_{y2}$ | $c_{y3}$ | $c_{y4}$ | $c_{y5}$ | $c_{y6}$ | $c_{y7}$ | $c_{y8}$ | $c_{y9}$ | ... |

A time interval refers to an interval comprising the time at which the operation data is collected. In some embodiments, the time interval is an actual time interval in which the reference audio interval, the reference temperature interval, and the reference vibration interval are located.

In some embodiments, the government safety monitoring management platform 110 may determine the first anomaly value, which is positively related to the operational intensity and the amplification coefficient, using Equation (6):

$$Y_1 = a \times (w_1 \times V + w_2 \times T + w_3 \times M), \quad (6)$$

wherein $Y_1$ denotes the first anomaly value, a denotes the amplification coefficient, V denotes the audio anomaly intensity, T denotes the temperature anomaly intensity, M denotes the vibration anomaly intensity, and $w_1$, $w_2$, and $w_3$ denote the weight coefficients of the audio anomaly intensity, the temperature anomaly intensity, and the vibration anomaly intensity, respectively.

In some embodiments, $w_1$, $w_2$, and $w_3$ are set by a person skilled in the art or by system default.

In some embodiments, when the reference audio interval, the reference temperature interval, and the reference vibration interval overlap (e.g., when the reference audio interval is $[a_{y1}, a_{y2}, a_{y3}]$, the reference temperature interval is $[b_{y1}, b_{y2}, b_{y3}]$, and the reference vibration interval is $[c_{y1}, c_{y2}, c_{y3}]$), then it is indicative that the current operational characteristic is the most closely aligned with the overlapping time interval (i.e., $t_{y1} \sim t_{y3}$), and the audio anomaly intensity, the temperature anomaly intensity, and the vibration anomaly intensity may reflect a degree of difference between the current operational characteristic and the time interval (i.e., $t_{y1} \sim t_{y3}$).

In some embodiments, in response to a possible causal relationship between the audio anomaly intensity, the temperature anomaly intensity, and the vibration anomaly intensity (e.g., a temperature anomaly leads to an audio anomaly and a vibration anomaly, or a cause may lead to a temperature anomaly, an audio anomaly, and a vibration anomaly at the same time), there is a higher likelihood of a real fault in the IoT system. Therefore, a degree of amplification is achieved by introducing the amplification coefficient, which assigns a greater weight to the audio anomaly intensity, the temperature anomaly intensity, and the vibration anomaly intensity. The degree of amplification matches an extent of overlap between the reference audio interval, the reference temperature interval, and the reference vibration interval.

In some embodiments of the present disclosure, by considering the amplification coefficient to reflect a correlation between the audio anomaly intensity, the temperature anomaly intensity, and the vibration anomaly intensity, the government safety monitoring management platform 110 can identify a real fault more effectively, rather than false positives caused by errors in monitoring data. In addition, by introducing the amplification coefficient, the government safety monitoring management platform 110 can determine the first anomaly value, further improving the accuracy and reliability of fault monitoring.

In some embodiments, the government safety monitoring management platform 110 determines the first anomaly value based on the operational intensity and an impact value.

The impact value refers to a numerical value used to characterize a degree of harm of an anomaly of the auxiliary component.

In some embodiments, the government safety monitoring management platform 110 determines the impact value of the auxiliary component by querying a second preset relationship table.

In some embodiments, the second preset relationship table includes a correspondence between the auxiliary component and the impact value. In some embodiments, the second preset relationship table is constructed based on historical data.

In some embodiments, the impact value correlates to a pipeline parameter of a reference pipeline, and a count of upstream and downstream users of the reference pipeline.

The reference pipeline refers to a gas pipeline where the auxiliary component is located.

The pipeline parameter of the reference pipeline refers to a parameter associated with the of a reference pipeline. For example, the pipeline parameter includes, but is not limited to, a diameter of the reference pipeline, a smoothness degree of the reference pipeline, an age of the reference pipeline, or the like.

The smoothness degree of the reference pipeline refers to a value used to reflect the impact and influence of gas flow in the reference pipeline on the auxiliary component.

In some embodiments, the government safety monitoring management platform 110 measures an inclination angle of the reference pipeline when constructing the reference pipeline. Through a plurality of experiments on the reference pipeline at the inclination angle, the average impact force on a wall of the reference pipeline is obtained, which is designated as the smoothness degree of the reference pipeline.

In some embodiments, the government safety monitoring management platform 110 determines the impact value in various ways. For example, the government safety monitoring management platform 110 determines the impact value based on the pipeline parameter and the count of the upstream and downstream users of the reference pipeline.

In some embodiments, the government safety monitoring management platform 110 performs clustering based on pipeline parameters, counts of upstream and downstream users of reference pipelines, and candidate actual impact values in the historical data to obtain a plurality of second clustering centers. Types of clustering algorithms may include K-Means clustering, Density-Based Spatial Clustering of Applications with Noise (DBSCAN), or the like. There is no limitation herein regarding the type of the clustering algorithm.

In some embodiments, the government safety monitoring management platform 110 constructs a plurality of second standard vectors based on the pipeline parameters of the auxiliary components corresponding to the plurality of second cluster centers and the counts of upstream and downstream users of the reference pipelines. A standard impact value corresponding to the second standard vector is determined by multiplying a count of people affected by an accident related to the corresponding auxiliary component during a subsequent period by a duration of an impact of the accident. If there are multiple accidents, the count of people affected by each accident is multiplied by the duration of the impact of the accident, then multiplication results are summed to obtain the impact value.

The duration of the impact of an accident refers to a time period from the occurrence of the accident to the complete resolution of the accident.

In some embodiments, the government safety monitoring management platform 110 constructs a second vector to be matched based on the pipeline parameter of the pipeline in which a current auxiliary component is located and the count of the upstream and downstream users of the reference pipeline.

In some embodiments, the impact value of corresponding to the second vector to be matched is determined by determining a similarity between the second vector to be matched and each of the plurality of second standard vectors. For example, the standard impact value of the second standard vector corresponding to a highest similarity is taken as the impact value corresponding to the second vector to be matched. The similarity between the second vector to be matched and the second standard vector is negatively correlated to a vector distance between the second vector to be matched and the second standard vector, the vector distance being determined based on a cosine distance, etc. For example, the similarity is a reciprocal of the vector distance.

In some embodiments of the present disclosure, the government safety monitoring management platform 110 takes into account relevant parameters (e.g., the diameter of the pipeline, the smoothness degree of the pipeline, and the age of the pipeline) of the gas pipeline (e.g., the reference pipeline) where the auxiliary component is located and the count of the upstream and downstream users of the pipeline. The impact value can more fully reflect the importance and potential impact of the auxiliary component, which helps to prioritize the auxiliary component that has a greater impact on the safety of the IoT system 100 and users of the IoT system 100 when determining the acquisition sequence and prioritizing maintenance, thereby further improving the overall operation efficiency and safety of the IoT system 100.

In some embodiments, the government safety monitoring management platform 110 determines the first anomaly value based on a positive correlation between the first anomaly value and the operational intensity and the impact value, using Equation (7):

$$Y_1 = w_1 \times V + w_2 \times T + w_3 \times M + w_4 \times P, \tag{7}$$

wherein $Y_1$ denotes the first anomaly value, V denotes the audio anomaly intensity, T denotes the temperature anomaly intensity, M denotes the vibration anomaly intensity, P denotes the impact value, $w_1, w_2, w_3, w_4$ denote the weight coefficients of the audio anomaly intensity, the temperature anomaly intensity, the vibration anomaly intensity, and the impact value, respectively.

In some embodiments, $w_1$, $w_2$, $w_3$, $w_4$ are set by a person skilled in the art or by system default.

In some embodiments, the impact value has a high level of importance for the first anomaly value. For example, if the impact value of an auxiliary component A is 1, and the impact value of an auxiliary component B is 10, then even if the auxiliary component A malfunctions, an accident is less likely to occur in the pipeline where the auxiliary component A is located because the first anomaly value of the auxiliary component A is small. On the contrary, even if the auxiliary component B experiences a minor damage, since the first anomaly value of the auxiliary component B is large, it is more probable that an accident occurs in the pipeline where the auxiliary component B is located.

In some embodiments of the present disclosure, the government safety monitoring management platform 110, by taking into account the impact value of the auxiliary component, ensures that the first anomaly values of auxiliary components of different degrees of importance are comparable, which helps to determine the acquisition sequence and the maintenance sequence, thereby improving the reliability and safety of the operation of the IoT system 100.

In some embodiments of the present disclosure, the government safety monitoring management platform 110 extracts the temperature data, the audio data, and the vibration data related to the operation of the auxiliary component from the operation data, and assesses the temperature data, the audio data, and the vibration data to determine whether the operation status of the auxiliary component is abnormal, thereby reducing errors caused by considering a single type of data alone, and ensuring that the measured first anomaly value can more accurately reflect the actual operation of the auxiliary component.

It should be noted that the foregoing description of process 300 is intended to be merely exemplary and illustrative without limiting the scope of the present disclosure. For a person skilled in the art, various modifications and changes may be made to the process 300 under the guidance of the present disclosure. However, these modifications and changes remain within the scope of the present disclosure.

Figure 4:
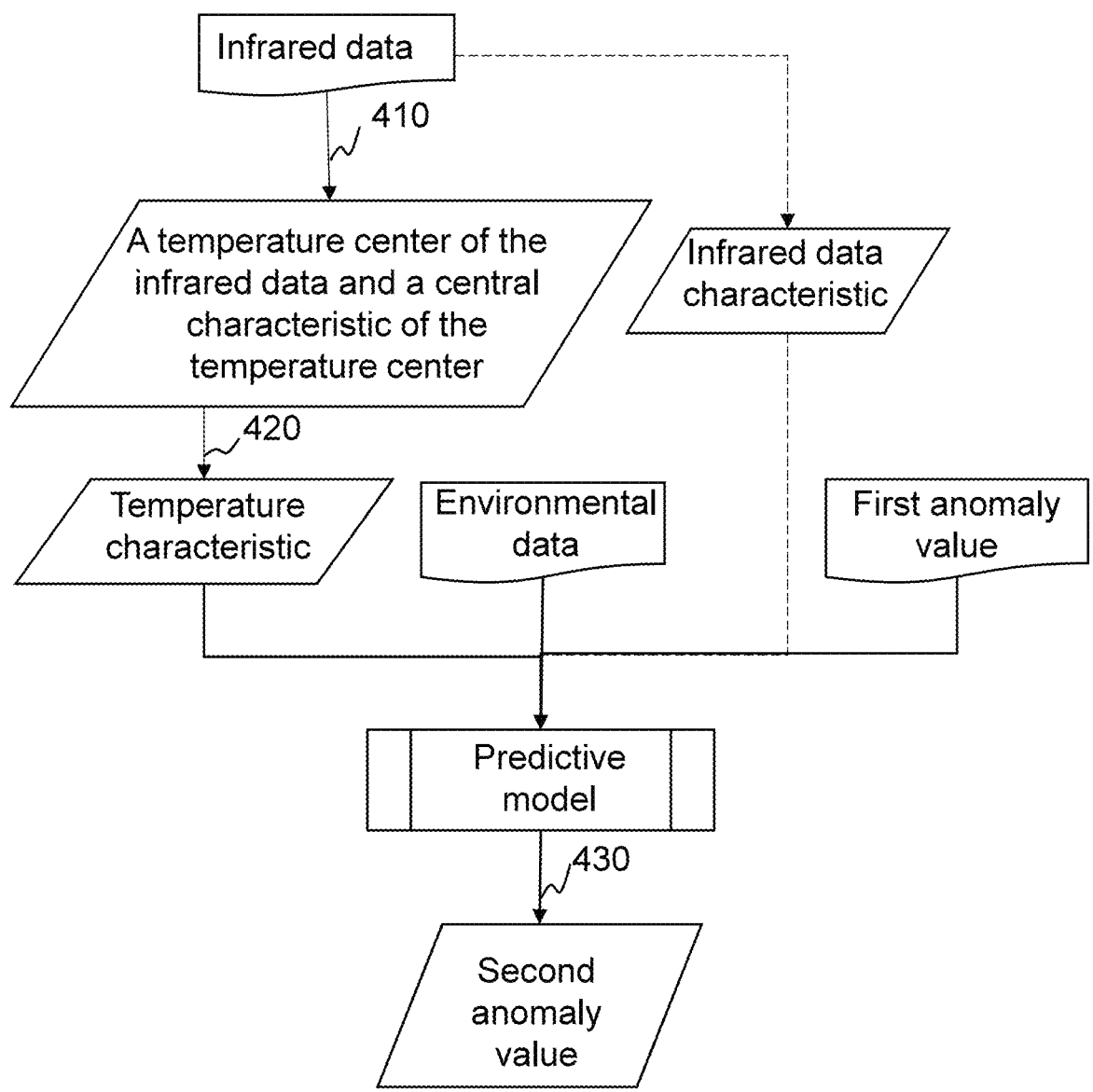
FIG. 4 is a flowchart of an exemplary process for determining a second anomaly value according to some embodiments of the present disclosure.

FIG. 4 is a flowchart of an exemplary process for determining a second anomaly value according to some embodiments of the present disclosure. As shown in FIG. 4, process 400 includes the following steps. In some embodiments of the present disclosure, the process 400 is performed on the government safety monitoring management platform 110.

In 410, determining, based on infrared data, a temperature center of the infrared data and a central characteristic of the temperature center.

A temperature center refers to a local maximum or minimum temperature center on an infrared thermogram. For example, as shown in FIG. 5, the temperature center includes a low temperature center at 4° C. and a high temperature center at 28° C.

Figure 5:
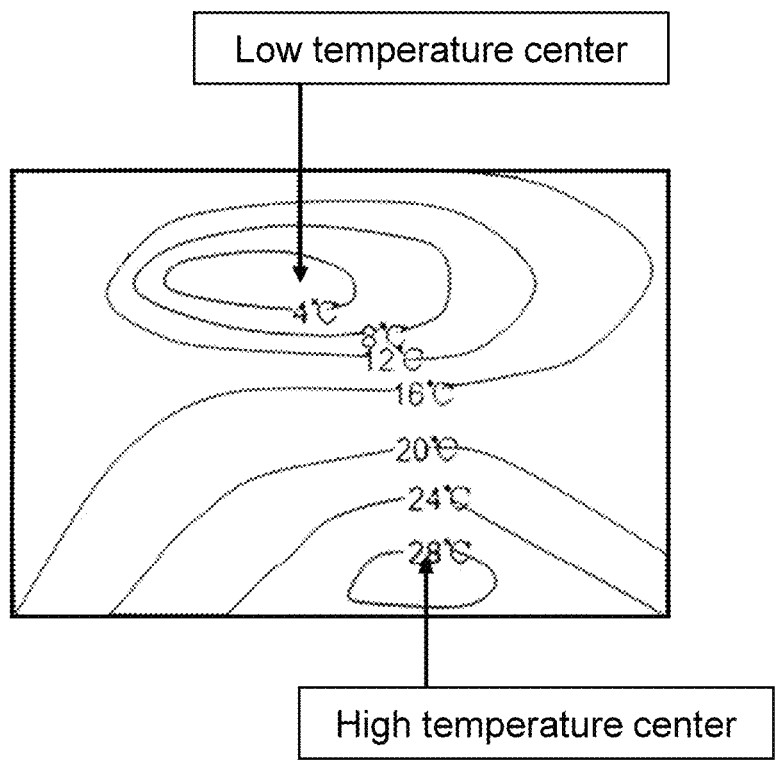
FIG. 5 is an exemplary schematic diagram illustrating the determination of a temperature center and a central characteristic of the temperature center according to some embodiments of the present disclosure.

In some embodiments, the government safety monitoring management platform 110 creates isotherms on the infrared data to obtain the infrared thermogram as shown in FIG. 5, thus obtaining a plurality of temperature centers.

An isotherm refers to a line formed on the infrared thermogram by connecting points with a same temperature. The isotherms clearly delineate regions of temperature distribution.

The central characteristic of the temperature center refers to a value that reflect an attribute of the temperature center. For example, the central characteristic of the temperature center includes the temperature of the temperature center and the range of the temperature center.

In some embodiments, the government safety monitoring management platform 110 reads the isotherms to obtain the temperature of the temperature center. In some embodiments, the government safety monitoring management platform determines the range of the temperature center based on a distance between the isotherms on the infrared thermogram and a scale used for imaging regions represented by the thermogram.

In 420, determining a temperature characteristic of the auxiliary component based on the temperature center and the central characteristic of the temperature center.

The temperature characteristic refers to data that reflects a temperature attribute of the auxiliary component. For example, the temperature characteristic of the auxiliary component includes the temperature of the auxiliary component.

In some embodiments, the government safety monitoring management platform 110 determines the temperature characteristic of the auxiliary component based on the temperature center and the central characteristic of the temperature center.

For example, the government safety monitoring management platform 110 determines the temperature characteristic of the auxiliary component through operations S421 to S422.

In S421, the government safety monitoring management platform 110 determines, based on a type of the auxiliary component, whether the auxiliary component belongs to the low temperature center or the high temperature center by querying a preset table.

The preset table includes a correspondence between types of auxiliary components and temperature centers. The government safety monitoring management platform 110 constructs the preset table based on experimental data by recording the most frequently observed experimental data for each type of auxiliary component. The experimental data includes low temperature center data and high temperature center data. For example, if an auxiliary component has low-temperature center data in 7 out of 10 experiments and high-temperature center data in 3 experiments, the auxiliary component is classified as the low temperature center.

The experimental data is obtained from field experiments conducted on various types of auxiliary components. For example, the government safety monitoring management platform 110 detects operation temperatures of each type of auxiliary component, and determines whether the each type of auxiliary component is the high temperature center or the low temperature center based on the operation temperatures and an ambient temperature, thus obtaining the low temperature center data and the high temperature center data. The ambient temperature refers a temperature of a surrounding environment of the auxiliary component.

In S422, determining the temperature characteristic of the auxiliary component.

In some embodiments, if the auxiliary component belongs to the low temperature center and there is only one set of low temperature center data, the low temperature center data is determined as the temperature characteristic of the auxiliary component. Otherwise, all low temperature center data are retained, all high temperature center data are excluded, and all infrared data corresponding to the retained low temperature center data are determined as candidate temperature data.

In some embodiments, if the auxiliary component belongs to the high temperature center and there is only one set of high temperature center data, the high temperature center data is determined as the temperature characteristic of the auxiliary component. Otherwise, all high temperature center data are retained, all low temperature center data are excluded, and all infrared data corresponding to the retained high temperature center data are determined as the candidate temperature data.

In some embodiments, when the candidate temperature data is determined, a range of the temperature center of the candidate temperature data is compared with a range of the auxiliary component. If a range difference is less than a range threshold, the candidate temperature data is determined as the temperature characteristic of the auxiliary component. The range difference refers to a distance between a geometric center of the range of the temperature center and a geometric center of the range of the auxiliary component. The range threshold refers to a threshold for determining whether the candidate temperature data is the temperature characteristic of the auxiliary component. In some embodiments, the range threshold is set by a person skilled in the art or by system default. The range of the auxiliary component refers to a temperature range determined by the inherent properties of the auxiliary component.

In 430, determining a second anomaly value based on the temperature characteristic, environmental data, and a first anomaly value.

In some embodiments, the government safety monitoring management platform 110 determines the second anomaly value based on the temperature characteristic of the auxiliary component, the environmental data, and the first anomaly value through vector matching. More descriptions of the environmental data and the first anomaly value may be found in FIG. 2 and the related descriptions thereof.

Merely by way of example, the government safety monitoring management platform 110 clusters temperature characteristics, a set of environmental data, first anomaly values and second anomaly values of the subsequent actual auxiliary components in the historical data to form a preset count of third clustering centers. Pipeline parameters of the gas pipelines (i.e., the reference pipeline) and counts of upstream and downstream users of the reference pipelines corresponding to third clustering centers are constructed into third standard vectors, and actual second anomaly values of the auxiliary component are determined as labels of the third standard vectors. The actual second anomaly value is a frequency of accidents actually occurred to the corresponding auxiliary component during a historical time period.

The government safety monitoring management platform 110 constructs a third vector to be matched based on the temperature characteristic of the auxiliary component, the environmental data, and the first anomaly value in the historical data. The government safety monitoring management platform 110 then determines a vector similarity between the third standard vectors and the third vector to be matched, and determine the label of the third standard vector with a highest similarity as the second anomaly value of the auxiliary component. The vector similarity is inversely related to a vector distance, which is determined based on a cosine distance, or the like. For example, the vector similarity is a reciprocal of the vector distance. More about the first anomaly value may be found in FIG. 2 and its related description.

In some embodiments, the government safety monitoring management platform 110 determines the second anomaly value based on the temperature characteristic, the environmental data, and the first anomaly value through a predictive model.

The predictive model refers to a model used to predict the second anomaly value. The predictive model is a machine learning model, e.g., at least one of a Convolutional Neural Networks (CNN) model, a Deep Neural Network (DNN) model, a Neural Network (NN) model, or the like.

In some embodiments, an input of the predictive model includes the temperature characteristic, the environmental data, and the first anomaly value, and an output of the predictive model includes the second anomaly value.

In some embodiments, the governmental safety monitoring management platform 110 conducts a plurality of iterations of training on an initial predictive model based on a plurality of labeled training samples to obtain a trained predictive model. For example, the government safety monitoring management platform 110 obtains a training dataset, selects one or more samples from the training dataset, and inputs the training sample into the predictive model to obtain the output of the predictive model. The government safety monitoring management platform 110 constructs a loss function based on the output of the predictive model and a label, iteratively inversely updates parameters of the predictive model based on the loss function, and ends the iteration when the loss function satisfies a preset condition. The model training is completed, and the trained predictive model is obtained. The preset condition may include the loss function converging, a count of the iterations reaching a threshold, or the like. The parameters of the predictive model may be updated using various techniques. For example, the governmental safety monitoring management platform 110 updates the parameters of the predictive model based on a gradient descent technique.

In some embodiments, the training sample includes sample temperature characteristics, sample environmental data, and sample first anomaly values of the auxiliary component at historical time points in the historical data. In some embodiments, the label is the frequency of accidents that actually occurred within a subsequent historical period after a historical time point.

In some embodiments, the predictive model is obtained after being trained based on a training set, validated based on a validation set, and tested based on a test set. The training set, the test set, and the validation set belong to a dataset that includes a sample temperature characteristic, sample environmental data, and a sample first anomaly value of a training sample from historical data.

In some embodiments, a data volume of the training set, a data volume of the test set, and a data volume of the validation set are in a preset ratio. In some embodiments, the government safety monitoring management platform 110 divides an available dataset into three portions (i.e., the training set, the validation set, and the test set) according to the preset ratio.

In some embodiments, the preset ratio is 8:1:1. In other words, the training set accounts for 80% of the dataset and is used to train the predictive model and adjust weights and parameters of the predictive model; the validation set accounts for 10% of the dataset and is used for validation during model training; the test set accounts for 10% of the dataset and is used for the final evaluation of the performance of the predictive model.

In some embodiments, there is no data overlap between the training set, the test set, and the validation set. No data overlap refers to that each data sample belongs exclusively to one of the training set, the validation set, or the test set during set division.

In some embodiments, a statistical variance of training samples in the training set is greater than a preset variance threshold, the preset variance threshold being related to a variance of impact values corresponding to the training samples in the training set. The statistical variance of training samples refers to data that reflects a diversity of the training samples in the training set. The greater the diversity of the training samples, the greater the statistical variance of the training samples.

Merely by way of example, the government safety monitoring management platform 110 quantifies the sample temperature characteristic, the sample environmental data, and the sample first anomaly value of each of the training samples in the training set into vectors. Next, the government safety monitoring management platform 110 determines, for all of the training samples in the training set, a vector distance between any two training samples in the training set, thereby obtaining a plurality of vector distances. Then, the government safety monitoring management platform 110 determines a variance of the plurality of vector distances, and determines the variance as the statistical variance of training samples. The greater the variance of the plurality of vector distances is, the greater the diversity of the training samples is, and the greater the statistical variance of the training samples is. More about quantifying vectors can be found in FIG. 2 and its related description.

The preset variance threshold refers to a benchmark value used to evaluate whether the statistical variance of the training samples in the training set meets requirements. In some embodiments, the preset variance threshold is positively correlated to the variance of the impact values corresponding to the training samples in the training set. For example, the preset variance threshold is the variance of impact values corresponding to the training samples in the training set. More on the impact value can be found in FIG. 3 and its related description.

Since a larger variance in impact values indicates more uncertainty in gas accidents and a wider range of potential impacts, increasing the preset variance threshold can ensure that the diversity of the training samples in the training set covers more actual situations, enabling the predictive model to learn to make predictions more accurately.

In some embodiments of the present disclosure, by introducing the statistical variance of the training samples, the diversity of training data can be increased during the training process of the predictive model. This ensures that the predictive model maintains good performance when faced with different situations and noisy data, thereby making the model more robust and preventing model overfitting, rather than relying on specific sample characteristics.

In some embodiments, the input of the predictive model may further includes an infrared data characteristic over a preset time period.

The infrared data characteristic refers to a temperature distribution feature in the infrared data. For example, the infrared data characteristic includes temperature distribution data.

In some embodiments, the government safety monitoring management platform 110 obtains the temperature distribution data via software built into an infrared detection device or other software (e.g., FLIR Tools) capable of reading the infrared data, and then determines the temperature distribution data as the infrared data characteristic.

In some embodiments of the present disclosure, the accuracy of the predicted second anomaly value can be further improved by including the infrared data characteristic over the preset time period into the input of the predictive model.

In some embodiments of the present disclosure, by introducing the predictive model, the second anomaly value can be determined automatically, and the prediction accuracy and prediction efficiency of the second anomaly value are improved, thereby enhancing the reliability of the IoT system 100. This enables the IoT system 100 to more promptly and accurately identify and warn of potential anomalies, ensuring its safe operation.

In some embodiments of the present disclosure, because the auxiliary component and the gas pipeline are in close proximity to each other, the measured infrared data may be interfered with by a variety of factors (i.e., interferences from high-temperature or low-temperature sources in the environment other than temperature anomalies caused by the operation of the auxiliary component). By determining the temperature center and the central characteristic of the temperature center, temperature data indicating temperature anomalies due to the operation of the auxiliary component can be filtered out, thus eliminating interfering data from the infrared data.

It should be noted that the foregoing description of process 400 is intended to be exemplary and illustrative only and does not limit the scope of the present disclosure. For a person skilled in the art, various modifications and changes may be made to process 400 under the guidance of the present disclosure. However, these modifications and changes remain within the scope of the present disclosure.

Some embodiments of the present disclosure provide a non-transitory computer-readable storage medium storing computer instructions. When the computer instructions are read by a computer, the computer implements the method for safety monitoring of a smart gas auxiliary component described in any one of the embodiments of the present disclosure.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for safety monitoring of a smart gas auxiliary component, the method being executed by an Internet of Things (IoT) system for safety monitoring of a smart gas auxiliary component, and the method comprising:
   determining a first anomaly value of an auxiliary component based on operation data of the auxiliary component, wherein the auxiliary component includes at least one of a flange, a valve, a compensator, a drainer, and a discharge pipe, the auxiliary component is disposed in a gas pipeline, and the operation data includes at least one of audio data, temperature data, and vibration data;
   determining a target acquisition parameter based on the first anomaly value, wherein the target acquisition parameter is a sequence for on-site infrared data collection;
   determining an acquisition instruction based on the target acquisition parameter, and sending the acquisition instruction to at least one of an interactive device of a staff member and a drone to control an infrared detection device to acquire infrared data of the auxiliary component according to the target acquisition parameter, the infrared data including an infrared thermogram;
   determining a second anomaly value of the auxiliary component based on the infrared data, environmental data, and the first anomaly value, wherein the environmental data is data related to an environment in which the auxiliary component is located, the second anomaly value is an adjusted numerical value or an adjusted alphabetical value of the first anomaly value of the auxiliary component, and the determining a second anomaly value of the auxiliary component based on the infrared data, environmental data, and the first anomaly value includes:
      determining, based on the infrared data, a temperature center of the infrared data and a central characteristic of the temperature center;
      determining a temperature characteristic of the auxiliary component based on the temperature center and the central characteristic of the temperature center; and
      determining the second anomaly value through a predictive model based on the temperature characteristic, the environmental data, and the first anomaly value, the predictive model being a machine learning model; and
   determining at least one of a maintenance instruction and a parameter adjustment instruction based on the second anomaly value, and sending the at least one of the maintenance instruction and the parameter adjustment instruction to a monitoring component and the interactive device, wherein the maintenance instruction is configured to instruct the staff member to manually maintain the auxiliary component, the parameter adjustment instruction is configured to adjust a monitoring parameter of the monitoring component before completing the maintenance, and the monitoring component is configured to monitor the operation data of the auxiliary component.

2. The method of claim 1, wherein the determining a first anomaly value of an auxiliary component based on operation data of the auxiliary component includes:
   determining a reference interval based on the operation data, the reference interval including at least one of a reference audio interval, a reference temperature interval, and a reference vibration interval;
   determining an operational characteristic based on the reference interval, the operational characteristic including at least one of an audio anomaly vector, a temperature anomaly vector, and a vibration anomaly vector;
   determining an operational intensity based on the operational characteristic, the operational intensity including at least one of an audio anomaly intensity, a temperature anomaly intensity, and a vibration anomaly intensity; and
   determining the first anomaly value based on the operational intensity.

3. The method of claim 2, wherein the determining the first anomaly value based on the operational intensity includes:
   determining an amplification coefficient based on the reference audio interval, the reference temperature interval, and the reference vibration interval; and
   determining the first anomaly value based on the operational intensity and the amplification coefficient.

4. The method of claim 2, wherein the determining the first anomaly value based on the operational intensity includes:
    determining the first anomaly value based on the operational intensity and an impact value, wherein the impact value characterizes a degree of harm of an anomaly of the auxiliary component.

5. The method of claim 4, wherein the impact value is related to a pipeline parameter of a reference pipeline and a count of upstream and downstream users of the reference pipeline, the reference pipeline being a gas pipeline in which the auxiliary component is located.

6. An Internet of Things (IoT) system for safety monitoring of a smart gas auxiliary component, comprising a government safety monitoring management platform, a government safety monitoring sensor network platform, a government safety monitoring object platform, a gas company management platform, a gas company sensor network platform, a gas equipment object platform, and a gas pipeline maintenance object platform, and the IoT system being configured to:
    instruct the government safety monitoring management platform to obtain, through the government safety monitoring sensor network platform, operation data of an auxiliary component acquired by the gas company management platform, the auxiliary component including at least one of a flange, a valve, a compensator, a drainer, and a discharge pipe, the auxiliary component being disposed in a gas pipeline, the operation data including at least one of audio data, temperature data, and vibration data;
    determine, via the government safety monitoring management platform, a first anomaly value of the auxiliary component based on the operation data; determine a target acquisition parameter based on the first anomaly value; determine an acquisition instruction based on the target acquisition parameter; send the acquisition instruction to the government safety monitoring object platform and further to at least one of the gas pipeline maintenance object platform and the gas equipment object platform to control an infrared detection device to acquire infrared data of the auxiliary component according to the target acquisition parameter, the infrared data including an infrared thermogram;
    acquire environmental data via the government safety monitoring sensor network platform;
    determine, via the government safety monitoring management platform, a second anomaly value of the auxiliary component based on the infrared data, the environmental data, and the first anomaly value, wherein the environmental data is data related to an environment in which the auxiliary component is located, the second anomaly value is an adjusted numerical value or an adjusted alphabetical value of the first anomaly value of the auxiliary component, and to determine the second anomaly value of the auxiliary component based on the infrared data, environmental data, and the first anomaly value, the IoT system is further configured to:
        determine, based on the infrared data, a temperature center of the infrared data and a central characteristic of the temperature center:
        determine a temperature characteristic of the auxiliary component based on the temperature center and the central characteristic of the temperature center; and
        determine the second anomaly value through a predictive model based on the temperature characteristic, the environmental data, and the first anomaly value, the predictive model being a machine learning model; and
    determine at least one of a maintenance instruction and a parameter adjustment instruction based on the second anomaly value, and send the at least one of the maintenance instruction and the parameter adjustment instruction to the gas company management platform, and further send the at least one of the maintenance instruction and the parameter adjustment instruction by the gas company management platform to the gas equipment object platform and the gas pipeline maintenance object platform, wherein the maintenance instruction is configured to instruct a staff member to manually maintain the auxiliary component, the parameter adjustment instruction is configured to adjust a monitoring parameter of the monitoring component before completing the maintenance, and the monitoring component is configured to monitor the operation data of the auxiliary component.

7. The IoT system of claim 6, wherein the gas equipment object platform is configured as the monitoring component, a drone, and the infrared detection device; and
    the gas pipeline maintenance object platform is configured as an interactive device of the staff member.

8. A non-transitory computer-readable medium, comprising executable instructions that, when executed by at least one processor, direct the at least one processor to perform a method for safety monitoring of a smart gas auxiliary component, the method being executed by an Internet of Things (IoT) system for safety monitoring of a smart gas auxiliary component, and the method comprising:
    determining a first anomaly value of an auxiliary component based on operation data of the auxiliary component, wherein the auxiliary component includes at least one of a flange, a valve, a compensator, a drainer, and a discharge pipe, the auxiliary component is disposed in a gas pipeline, and the operation data includes at least one of audio data, temperature data, and vibration data;
    determining a target acquisition parameter based on the first anomaly value, wherein the target acquisition parameter is a sequence for on-site infrared data collection;
    determining an acquisition instruction based on the target acquisition parameter, and sending the acquisition instruction to at least one of an interactive device of a staff member and a drone to control an infrared detection device to acquire infrared data of the auxiliary component according to the target acquisition parameter, the infrared data including an infrared thermogram;
    determining a second anomaly value of the auxiliary component based on the infrared data, environmental data, and the first anomaly value, wherein the environmental data is data related to an environment in which the auxiliary component is located, the second anomaly value is an adjusted numerical value or an adjusted alphabetical value of the first anomaly value of the auxiliary component, and the determining a second anomaly value of the auxiliary component based on the infrared data, environmental data, and the first anomaly value includes:
        determining, based on the infrared data, a temperature center of the infrared data and a central characteristic of the temperature center;

determining a temperature characteristic of the auxiliary component based on the temperature center and the central characteristic of the temperature center; and determining the second anomaly value through a predictive model based on the temperature characteristic, the environmental data, and the first anomaly value, the predictive model being a machine learning model; and determining at least one of a maintenance instruction and a parameter adjustment instruction based on the second anomaly value, and sending the at least one of the maintenance instruction and the parameter adjustment instruction to a monitoring component and the interactive device, wherein the maintenance instruction is configured to instruct the staff member to manually maintain the auxiliary component, the parameter adjustment instruction is configured to adjust a monitoring parameter of the monitoring component before completing the maintenance, and the monitoring component is configured to monitor the operation data of the auxiliary component.

\* \* \* \* \*